United States Patent [19]

Clark et al.

[11] 3,967,283

[45] June 29, 1976

[54] LARGE AREA MOTION SENSOR

[75] Inventors: Robert V. Clark, Washington, D.C.; Francis X. Linder, Landover, Md.; Terrance J. McCreary, Gaithersburg, Md.; William R. Taylor, Olney, Md.

[73] Assignee: Automation Industries, Inc., Silver Spring, Md.

[22] Filed: Sept. 26, 1974

[21] Appl. No.: 509,571

Related U.S. Application Data

[63] Continuation-in-part of Ser. No. 442,025, Feb. 13, 1974, abandoned.

[52] U.S. Cl. ............................. 343/7.7; 343/5 PD; 343/14; 343/17.2 PC; 340/258 B
[51] Int. Cl.² ............................................. G01S 9/42
[58] Field of Search ............... 343/7.7, 5 PD, 12 A, 343/14, 17.2 PC; 340/258 B

[56] References Cited
UNITED STATES PATENTS

| 3,344,423 | 9/1967 | Thue | 343/12 A |
|---|---|---|---|
| 3,500,399 | 3/1970 | Norris, Jr. | 343/7.7 |
| 3,562,750 | 2/1971 | Fishbein et al. | 343/7.7 |
| 3,665,443 | 5/1972 | Galvin | 343/7.7 X |
| 3,741,655 | 6/1973 | Ling et al. | 356/5 |
| 3,761,946 | 9/1973 | Johannessen et al. | 343/12 A |

Primary Examiner—Maynard R. Wilbur
Assistant Examiner—S. C. Buczinski
Attorney, Agent, or Firm—Jones, Tullar & Cooper

[57] ABSTRACT

An intrusion detector operating with electromagnetic sensors to detect intruder motion within large, defined areas is disclosed. The system provides an acceptably low false alarm rate by means of range discrimination whereby moving objects outside the protected area do not affect the system and by improving sensitivity to slow-moving targets even when located very close to the sensor location. The system incorporates a transmitter which is frequency modulated by a triangular or sawtooth wave and a receiver which produces an output signal that varies in accordance with the instantaneous difference between the transmitted and received frequencies. The frequency of this difference signal is the beat frequency, and is proportional to the range of the target. Storage means are provided to permit comparison of successively received signals over a predetermined period of time, and this comparison serves to reveal slowly varying changes in the return signal pattern. Alarm means are provided which respond to significant variations in successive measurements, and when a threshold level of difference is exceeded for a certain number of consecutive sweeps, an alarm is sounded.

22 Claims, 12 Drawing Figures

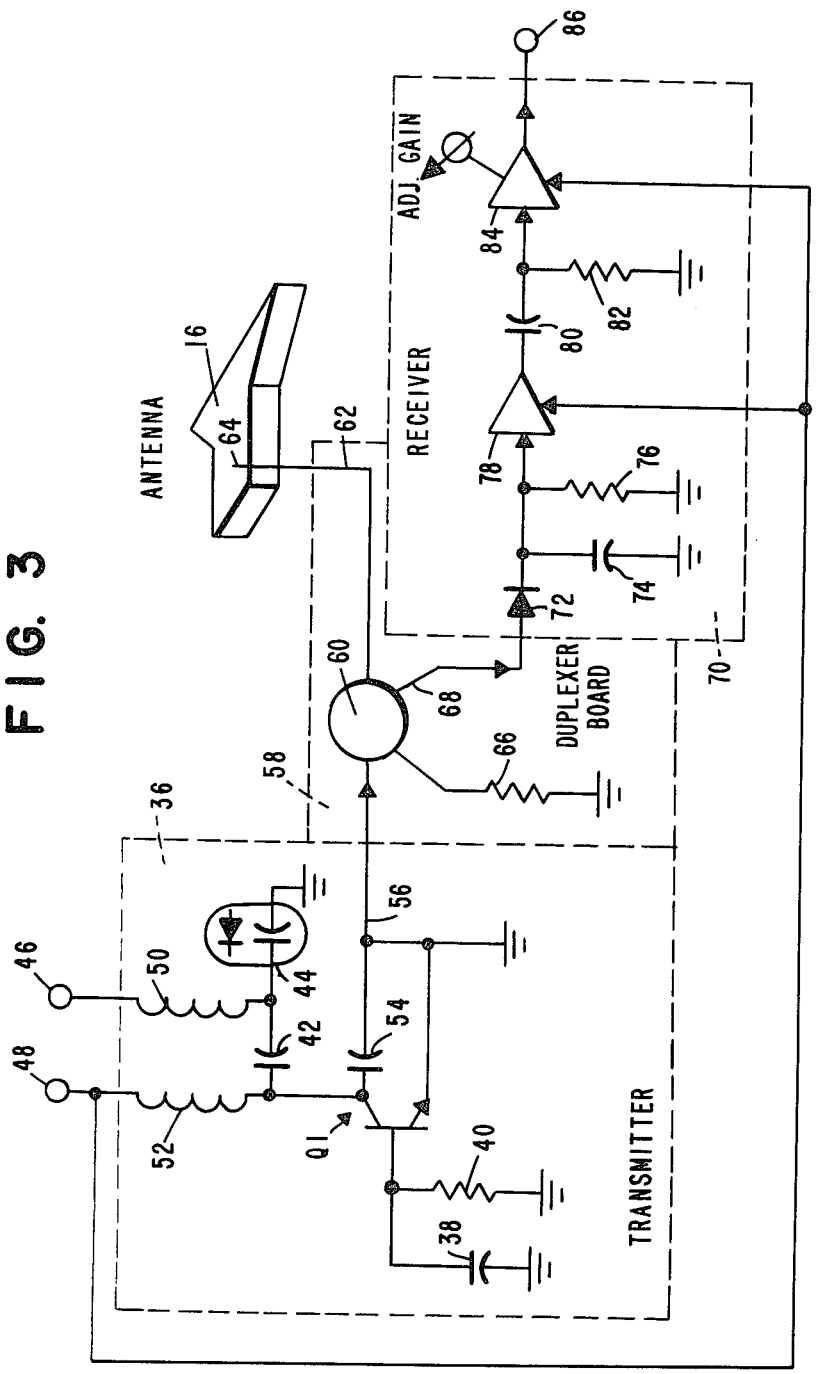

LARGE AREA MOTION SENSOR

BACKGROUND OF THE INVENTION

This application is a continuation-in-part of U.S. application Ser. No. 442,025 filed Feb. 13, 1974 and entitled "Large Area Motion Sensor", now abandoned.

The present invention relates, in general, to surveillance devices, and more particularly to electromagnetic systems for detecting motion, for example due to intruders within an area to be protected, which system is capable of maintaining a high degree of sensitivity and high reliability against false alarms, while also being capable of disregarding certain kinds of motion within the protected area.

Intrusion detectors which operate on the principle of detecting target motion are well known, and commonly utilize the Doppler principle. This type of device transmits an electromagnetic or acoustic signal of constant frequency and receives reflected signals. A moving object in the field of the sensor causes the reflected wave to vary from the frequency of the transmitted wave, this variation depending upon the rate and direction of the motion. This difference may be measured at the receiver and used as the basis for determining the presence of a moving object. Continuous wave radar systems utilizing the Doppler principle are well known, for such systems are commonly used in police radar systems or in short-range, small-area intrusion detectors. However, it has been found that known, relatively simple radar techniques are inadequate for large area surveillance, while more sophisticated techniques used, for example, in battlefield surveillance systems, are economically unsuited to the type of system required in the present instance. Large and complex radar systems require specialized maintenance and incur costs that are not justified for intrusion detectors which may be installed in a fixed location to provide surveillance for a factory, a fenced enclosure in which security is to be maintained, or other large but relatively well defined areas where it is desired to detect the presence of any intruders.

When used in intrusion detectors, the Doppler technique, furthermore, has important disadvantages. First, an unmodulated continuous wave radar or acoustic wave signal has no means of range discrimination; a large, distant target is indistinguishable from a small near one. Second, in the case of the slow-moving target, the Doppler shift is so small that the received signal may be obscured by strong thermal noises created by the transmitter oscillator near the frequency of the oscillator, thus limiting the sensitivity of the system. A third problem is that such radar systems are unable to discriminate against dynamic clutter; that is, against reflections that indicate moving targets which do not represent intruders and which are not, therefore, of interest. Dynamic clutter may be caused by moving vehicles outside the protected area, operating machinery within the area to be protected, the motion of trees in the wind when the area to be protected is out-of-doors, and the like. Finally, such systems are vunerable to vibrations of all kinds within the protected area and thus are very susceptible to false alarms.

Other difficulties that are encountered in developing an intrusion detector utilizing electromagnetic waves include that of providing a detector which is usable in a variety of environments. The reflection and transmission characteristics of materials surrounding the location of such a detector can vary greatly, for metal objects, for example, may be regarded as perfect reflectors for all practical purposes while non-metallic building materials are less effective as reflectors. Dry wall, wallboard and similar materials have a low reflectivity, glass does not reflect as well as metal, and thicker materials like brick, although of similar reflection characteristics to wood and wallboard, cause more attenuation of energy that is not reflected because of their greater thickness, and all of these variations affect the operation of the device. Furthermore, the angle of incidence of the electromagnetic waves, the amount of moisture in the surface, the roughness of the surface, and like characteristics all affect the amount of energy that will be returned to a transmitter-receiver detector system. The returned signal is also affected by the contents not only of the room or area in which the detector is located, but adjacent areas as well. Since the returned signal received by the intrusion detector is dependent upon the number and types of targets within the area being surveyed, the presence of such reflectors creates a very complex return wave form which creates serious problems in detecting the signals created by an intruder. Thus it may be seen that the provision of a reliable and accurate electromagnetic intrusion detector presents serious problems because of the very nature of the electromagnetic wave and because of the difficulties encountered in attempting to sort out and separate the various returned signals to isolate a signal representing the presence of a moving intruder.

SUMMARY OF THE INVENTION

It is accordingly an object of the present invention to overcome the difficulties inherent in prior art electromagnetic intrusion detectors and to provide a system which is capable of maintaining under surveillance a selected large area and for accurately and reliably excluding the effects of clutter and noise to permit accurate and reliable detection of a moving intruder.

It is a further object of the invention to provide an intrusion detector utilizing electromagnetic waves which is capable of providing surveillance of a definable, limited but relatively large area.

It is another object of the present invention to provide an intrusion detector utilizing electromagnetic waves in which range discrimination is provided and in which slow moving targets can easily be detected.

It is another object of the present invention to provide a system for detecting intruders within a protected area through the use of a radar transmitter and receiver, wherein the receiver is highly sensitive to slow moving targets within the area being protected while at the same time is capable of rejecting signals caused by static and dynamic clutter occurring both within and without the area being surveyed.

Briefly, the present invention incorporates a continuous wave homodyne radar system in which the transmitter oscillator, which also serves as the receiver local oscillator, is frequency modulated by a triangular or sawtooth wave. The frequency of the receiver output will vary in accordance with the instantaneous difference between the transmitted and received frequency, which difference is a function of the distance traveled by the returned signal and is thereby a function of range. The receiver includes means for storing some significant parameter of the received signal for a period of time, the period of time depending upon the minimum target velocity to be detected and being the time required for the target to move about ¼ of a wavelength in free space at the frequency of the transmitter carrier wave. The significant parameter which is to be stored includes, but is not limited to, the peak value of the received signal; the amplitude of the signal envelope; the location in time of zero crossings, peaks, or minima of the wave; or the total or partial information content of the wave as determined by sampling and digital encoding of the sample amplitudes. The storage means may include such elements as digital storage registers; storage tubes; magnetic tapes, discs or drums; optical recording, or the like.

The present system further includes means for periodically comparing the significant parameter content of a current sweep of the frequency modulation, or the sum or average of several sweeps, with the previously stored content of an earlier sweep, or the sum or average of several earlier sweeps. Finally, means are provided for deriving alarm criteria from a difference between a current sweep and the previously stored content of an earlier sweep.

There are numerous criteria which must be met in designing a radar system utilizing electromagnetic waves for the detection of moving intruders within well defined areas, for considerations such as unit cost, reliability, sensitivity, and the like must be balanced off to produce a system which is small and unobtrusive, may easily be installed in a desired location, may be adjusted to provide protection for desired areas without interference from adjacent areas, and which provides sufficient power, sensitivity, and reliability to be available and marketable end product. In developing such a system, consideration must be given to the radar equation, which defines the ratio of the received and transmitted power; that is, the gain along the path followed by an emitted electromagnetic wave which is reflected and returned to the receiver. This ratio may be obtained by calculating the energy density $p_i$, in watts per unit area, impinging on a radar target at a range $R_T$ from a transmitter, which may be defined as follows:

$$P_i = G_T P_T / 4\pi R_T^2$$

where $G_T$ is the gain of the transmitting antenna and $P_T$ is the transmitted power. A fraction $\sigma$ of this power is reflected, or scattered, in the direction of the receiver by the target, given an incident energy $P_i$ at the receiver which may be defined as follows:

$$P_r = \sigma P_i / 4\pi R_R^2$$

of which a fraction $A = G_R \lambda^2/4$ is actually delivered to the receiver. Combining these expressions give the general expression for path gain which is applicable to both monostatic radar system, where the transmitter and receiver are at a single location, and bistatic systems, where the transmitter and receiver are separate, as follows:

$$P_R/P_T = \frac{G_R G_T \lambda^2 \sigma}{(4\pi)^3 R_R^2 R_T^2}$$

In the monostatic case $R_T = R_R = R$ and (usually) $G_R = G_T$, so that the above equation becomes:

$$P_R/P_T \text{ (mono)} = \frac{G^2 \lambda^2 \sigma}{(4\pi)^3 R^4}$$

As noted above, radar operates in the vicinity of reflecting objects other than the desired target and the return of energy from such objects creates false targets generally referred to as clutter. Although stationary clutter does not contribute significantly to the output signals produced by a true Doppler radar, since the clutter does not produce a shift in the frequency of the returned signal, it does affect the system range requirements and may limit sensitivity by reflecting transmitter noise. However, a system which utilizes range information, as in the present system, is more directly affected by stationary clutter. The effect of clutter on the system will, of course, depend upon the amount of energy reflected from surfaces both within the room or area to be protected and from adjacent areas. A gymnasium or open field, for example, would be relatively clutter-free, while a machine shop or garage would provide very severe clutter. However, the transmitter and receiver of an intrusion detector can be situated with respect to the area to be protected so that no larger reflecting surface is within some predetermined minimum range, for it has been found that the major portion of the returned signals due to clutter is returned by nearby reflecting surfaces. Further, it has been found that where surveillance is to be of an enclosed area such as a large room, the presence or absence of bounding walls around the area makes little difference if the room is large enough, unless the walls are made of a reflecting material.

Dynamic clutter produces a more difficult problem in a motion detecting system, for dynamic clutter is created by moving objects. Two types of dynamic clutter are of concern and must be taken into account in the intusion detector design. Internal dynamic clutter is created by moving objects such as fans, vibrating machinery or structures such as heating ducts, moving curtains, small animals and the like within the area which is to be protected by the surveillance system. External dynamic clutter consists of moving objects such as vehicles or the like outside the protected area which may be remote in range but larger in radar cross section.

In conventional unmodulated radar systems utilizing the Doppler principle, the only protection against external moving targets is the decrease in signal strength with range. A large tank truck may have a radar cross section of as much as 1,500 square meters, which is 5,000 times larger than a human target. As compared with a human target at the far side of a 100 foot square room, a tank truck at 1,080 feet would, therefore, give the same radar signal return, and a larger return at smaller distance. Of course, judicious selection of the site of the transmitter and receiver can reduce the effect of external dynamic clutter, particularly if such targets are predominately in one direction. However, if the protected area is surrounded by parking lots, alleys, roads, or the like, moving vehicles will inevitably be detected in a Doppler type system. Another problem can be created by a person walking along a corridor outside a secured room, for it is very difficult to create a continuous wave, unmodulated system which is capable of detecting on which side of the wall the person is walking. It is possible that signal losses caused by the radar waves passing twice through the wall would permit a critical threshold sensitivity setting that would allow rejection of targets outside the area; however, such threshold settings are not a reliable method of reducing false alarms.

An unmodulated continuous wave system has no inherent protection against moving objects within the area being protected, since this is precisely what the system is designed to detect. Thus, it is very difficult to prevent false alarms caused by machines, small animals and the like. Some measures may be provided to reduce false signals with such a system. For example, the use of moderately long wave lengths would discriminate against small animals as targets, and specific objects, like a particular machine, might be shielded with metallic foil at the expense of creating an unprotected shadow area. However, these are make-shift measures and are not always effective to eliminate false signals.

Dynamic clutter problems can be greatly mitigated by making the radar system sensitive to range in some manner. In conventional pulsed radar, it is common to provide a range gate which is effective in rejecting the kind of return that is typical of exterior clutter. If the transmitted pulse can be made short enough, the transmitter oscillator is off when the reflected signal returns, and the problem of noise generated by the oscillator during the return is eliminated. However, a pulse type system is not suitable for close range surveillance systems, for if static clutter from the nearest scatters is to be rejected, the pulse width of the transmitted signal cannot exceed about 30 nanoseconds, and this would require a signal band width exceeding FCC allocations for this kind of device. The present invention avoids the problems of dynamic clutter and the difficulties of pulsed radar systems through the use of pulse compression techniques. In accordance with this system, the transmitter is simultaneously modulated in both amplitude and frequency, or simply in frequency, so that returns from different ranges of reflecting targets come back to the receiver at different frequencies as well as at different times. This system permits a great amount of range discrimination per unit of band width and has been found to be particularly useful in short range situations such as the intrusion detector of the present invention where continuous transmitter power is not a major factor. If the transmitter is frequency-modulated with a sawtooth wave F times per second with a maximum deviation in frequency of D Hz, a signal that has been reflected from a target and has returned to the receiver will have a frequency in an amount $f = 2RFD/c$ where R is the range in feet and c is the velocity of light. Thus, for example, if F equals 150 Hz and D equals 15 MHz, the frequency of a return signal from a distance of 16 ft. will differ from the instantaneous transmitter frequency by 75 Hz and the return from a scatterer 300 feet from the transmitter will differ from the instantaneous transmitter frequency by 1,385 Hz. If the instantaneous frequency of the transmitter oscillator is used to demodulate these returns, the output from the receiver will be an ensemble of audio tones, each representing the range of a scatterer inside or ouside the area to be protected. The lower frequencies, e.g. in the area of 75 Hz, will tend to be the largest in amplitude because these result from scatterers near the transmitter.

If it is desired to protect only a selected zone, for example the area between the minimum range of the system and 300 feet, the audio signal output from the receiver may be filtered to discriminate against signals having frequencies representing returns from targets outside the zone; i.e., outside the 75 to 1,385 Hz range. A low pass filter cutting off sharply just above 1,385 Hz will reject all external clutter beyond 300 feet, while a high pass filter below 75 Hz will eliminate targets closer than 16 feet. Such a high pass filter has the added advantage of eliminating the effects of stray coupling between the transmitter and receiver. In addition, the output from the receiver may be further modified within the 75 to 1,385 Hz pass band through slope and notch filtering to achieve special effects by modifying the frequency characteristics of the receiver output. For example, the signal from the receiver may be passed through a simple RC high-pass filter to provide range equalization, wherein the amplitude of the returns from targets at all ranges are proportional only to the range. Further, twin-T or bridged-T notch filters may be set to discriminate against targets at specific ranges, enabling the system to null out a vibrating machine, for instance. Thus, by appropriate selection of filters the zone of coverage by the system can be specified to povide a variety of geometric patterns.

Another advantage of the frequency-modulated system is that it provides FM quieting of transmitter noise reflected from nearby large targets and otherwise coupled to the receiver, resulting in much higher sensitivity than is possible in a CW doppler system.

Although the benefits of a frequency modulated system overcome virtually all the problems of continuous wave Doppler type systems discussed above, there is a penalty: the very simple distinction between moving and stationary targets provided by Doppler type systems is no longer available. The system becomes a ranging radar, requiring further processing to detect motion, for it is no easy matter to detemine whether one of the complex of tones of different amplitudes and frequencies from the receiver is changing on an instantaneous basis. That is, the complex audio output from the receiver at each sweep of the sawtooth modulation is an indication of the location of targets within the selected range of the system during that sweep and to determine whether any one of the targets has moved from one sweep to the next requires correlation of the return from one sweep with the return from an earlier reading. Accordingly, an incoming signal may be delayed and compared with a later signal, with the amount of delay depending upon the rate of change of a target that is to be detected.

If it is desired to detect a human intruder moving radially with respect to the detector system at a velocity of 0.1 feet per second the Doppler frequency for such motion in a ten-centimeter wave length radar system would be 0.6 Hz. That is, the return at the frequency association with the range of this particular target would go through its peak-to-peak amplitude range at least once during an interval of 1.67 seconds. Although higher target velocities would require correspondingly shorter times, to ensure the most favorable target response the delay for comparison purposes between two received signals should be 1.67 seconds. This is a very long delay time for an electrical or even an acoustical delay line, and although such a device could possibility be built, it would be bulky and expensive. Magnetic recording of such signals is more feasible, for a magnetic disc provides this order of delay and is relatively immune to temperature effects, but dust accumulation can be a problem and the drive motor can easily use up most of the available power unless specifically designed.

The present invention contemplates the use of circuitry by which the received signal is encoded through some form of pulse-code modulation, whereby shift registers may be used to store samples and digital logic techniques may be used for sample comparison. With such an arrangement, potential alarm signals may be accumulated in a counter with an adjustable full count to provide an additional degree of freedom from false alarms in noisy environments. It has been found that in such a system, the receiver output can be adequately described by an 8-bit binary code. To encode the received signal, the amplified and filtered output of the receiver detector is modulated by a short sampling pulse which, in the above-described example, occurs at somewhat more than twice the maximum signal frequency of 1,385 Hz. Each sample is latched in amplitude momentarily by a sample and hold circuit to permit encoding by a standard analog to digital converter. The parallel output of the converter is fed into a 8-bit register and then is clocked out at the sample pulse rate.

In the embodiment of the invention a sampling rate of 4800 per second fulfills the sampling theorum and is exactly 25 times the modulation frequency of the example given above to facilitate synchronization. Thus 32 samples are taken of each frequency sweep and the amplitude of each sample is encoded as an 8-bit byte by the analog to digital converter so that a 256 bit word describes the contents of the room to the limit of the radar sensitivity. In accordance with the present system, this word is stored in a 256 bit shift register and is recirculated 256 times for repeated bit by bit comparison with each new data word that is received. The 256 word comparison requires 256 (1/150)=1.71 seconds, just in excess of the storage time required to detect 0.1 feet per second motion, as described above. As each new bit is received, it is compared with the corresponding bit from the storage register in an exclusive-OR gate. If the two bits are alike, a zero output results, indicating that there has been no change in the corresponding target. If they are unlike, a 1 output will be sent to the error counter which may be adjusted to provide an alarm output for any desired number of error counts from 1 up to its full scale. Normally, the setting will be some number larger than 1 to prevent false alarms on occasional noise pulses.

After each cycle of 256 words (that is, every 1.7 seconds), a new room sample is entered to update the stored data. This compensates for slowly changing parameters, such as oscillator frequency drift, or objects moving slower than 0.1 feet per second.

Various refinements of the foregoing system are possible. By incorporating a full adder and an additional register, the reference sample may be made to represent the average of a desired number of sweeps of the room to average out noise. The resampling process, where a new room sample is entered in the register, may be made adaptive, rather than periodic, by providing for a new sample whenever more than a selected number of errors is produced in a single sweep. This would provide protection against false alarms caused by occasional bursts of noise.

The frequency modulation of the present system also lends itself to multiplexing so that two systems on the same carrier frequency can be provided without interference. This is accomplished by operating the transmitters of the two systems on alternate cycles of modulation. Each receiver is then provided with two storage registers and the registers are gated alternately so that each transmitter-receiver system is compared with its own delayed record. It should also be noted that any number of systems can be operated on the same frequency without mutual intereference if they are synchronized by a common clock or other common time reference, such as the AC power line frequency.

BRIEF DESCRIPTION OF THE DRAWINGS

The foregoing and additional objects, features and advantages of the present invention will become evident from a consideration of the following description of a preferred embodiment thereof, taken with the accompanying drawings, in which:

FIG. 3 is a schematic diagram of a suitable transceiver for use with the intrusion detector;

Figure 1:
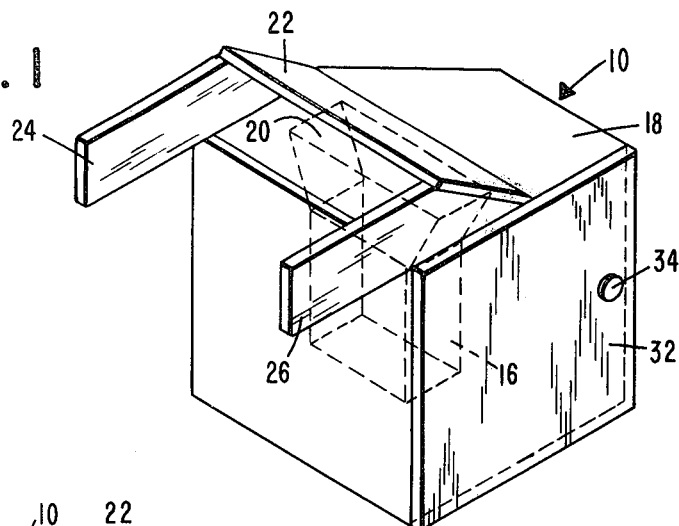
FIG. 1 is a perspective view of an enclosure suitable for the intrusion detector of the present invention.
Figure 2:
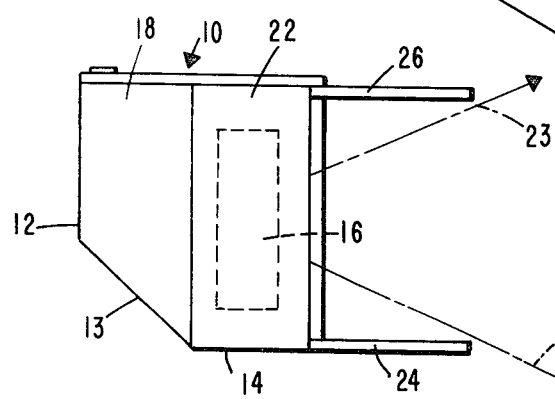
FIG. 2 is a top plan view of the enclosure of FIG. 1, illustrating its relationship with walls or boundaries of the area to be protected.

The intrusion detector of the present invention is designed to be used in the monostatic mode so that the transmitter and receiver are contained in the same enclosure. Such an enclosure is generally illustrated in FIGS. 1 and 2 as comprising an irregular housing 10 shown in perspective view in FIG. 1 and in top plan view in FIG. 2. The irregular shape of the housing provides three side surfaces 12, 13 and 14 which permit the unit to be mounted with the antenna in a desired relationship to the mounting surface. The antenna is indicated in phantom at 16 as being a sectoral horn mounted vertically within the enclosure and communicating with the exterior thereof through a slot in the top surface 18. The horn slot is protected against tampering by a heavy sheet of fiberglass-reinforced plastic 20 mounted flush in the slot by cementing it to an interior shoulder provided in the enclosure for this purpose. A reflector 22 is secured to the exterior surface of the housing as by welding and is preferably of the same sheet steel material as the enclosure. The reflector is secured at an angle to redirect the beam of the antenna in a desired direction, forwardly of the enclosure, generally as indicated at 23 in FIG. 2. Beam-confining plates 24 and 26 may be bolted or hinged to the sides of the corner reflector 22 to assist in directing the beam. It will be noted that the beam 23 need not be confined to an angle of less than about 45° because most of the energy from the beam that strikes targets such as a wall 28 or an exterior target 30 at small angles to the beam axis is lost by multiple reflections, as indicated by the reflected beam components 23' in FIG. 2.

Access to the enclosure is by means of a flanged door 32 with a high security lock 34. All electronic components are mounted on printed circuit boards which are mounted in suitable shielded boxes at convenient locations in the enclosure. The duplexing circuitry which connects the antenna to the transmitter or the receiver preferably is mounted on the waveguide portion of antenna 16 with the transmitter circuits. A pin from the duplexer board passes through a suitable hole in the surface of the antenna 16, extending into the waveguide portion of the antenna approximately ¼ wave length above the bottom surface of the guide. This pin provides the coupling between the transmitter and receiver and the antenna. The waveguide and horn portions of the antenna are made of a thin conductive sheet metal, with the overall construction of the device being such that it is virtually tamper free and thus is suitable for use as an intrusion detector.

Although the use of a bistatic system generally improves the performance of a continuous wave homodyne radar system by reducing the ratio of maximum to minimum target return, it has been found to be less suitable for the frequency modulated system of the present invention. In a bistatic system, the delayed direct-path signal to the receiver becomes the reference frequency, rather than the instantaneous oscillator frequency. Because of this, targets located near the direct path line will appear in the receiver output as having about a zero difference frequency, rather than the 75 Hz difference frequency described above in the monostatic system. This lack of a difference frequency for near targets prevents the use of high pass filtering for elimination of oscillator noise and thus reduces system sensitivity by a significant factor so that monostatic operation is actually superior in performance, besides being lower in production cost and ease of installation.

The transmitter utilized in the present system is generally indicated at 36 in FIG. 3, to which reference is now made. The design of the particular transmitter circuitry is determined primarily by the operating frequency and power output desired. As transmitter power is raised, and receiver sensitivity correspondingly reduced, the detector system becomes more immune to interference from other sources, and assuming that it adheres to prescribed emission standards the fact that it also becomes more capable of interfering with other systems can be neglected within reasonable limits. Since the system should be capable of operating unattended in environments where electrical interference may be severe and further is subject to rigorous false alarm criteria, the foregoing are important considerations. Furthermore, it has been found that increasing transmitter power has the effect of increasing target return more than it increases oscillator noise. Accordingly, it is desirable to have as much transmitter power as is feasible for the particular installation and use of the system, bearing in mind the need to operate from standby battery power supply in some situations. It will be understood that variations in transmitter frequency and power can be made without departing from the scope of the invention.

One implementation of transmitter 36 incorporates a transistor Q1 such as a Fairchild MT5766 or its equivalent, mounted on a printed circuit board having etched striplines serving as emitter and collector resonators. The printed circuit board is double-clad with the back side serving as a ground plane for the transmission lines and as one plate of a bypass capacitor 38 connected to the base of Q1. A resistor 40 is also connected between the base of Q1 and the ground plane. Connected to the collector of Q1 through a DC blocking compacitor 42 is a varactor 44, which may be of a type MV1858D or type MV1860D, which provides frequency modulation and fine tuning of the oscillator circuit from alternating current and direct current components derived from the data processing circuit to be described by way of terminal 46 and indicator 50. Bias voltages are applied to the transmitter circuit by way of terminal 48 and inductor 52.

A blocking capacitor 54 is connected between the collector of transistor Q1 and the collector stripline resonator, and the resonator is connected to an etched transmission line 56 which carries the transmitter output to a connected pin by means of which the transmitter board is coupled to a duplexer board 58. The duplexer board carries a conventional duplexer 60 which permits use of the same antenna for transmitting and receiving, and may be of any conventional construction. The duplexer is connected by way of line 62 to a pin 64 extending into the waveguide portion of antenna 16 to couple the electrical circuitry to the antenna. A termination resistor 66 may be provided for the duplexer, if desired. In the transmit mode, the duplexer 60 connects transmission line 56 to line 62 and thus to the antenna, whereby the oscillations generated by transmitter Q1 are transmitted from the antenna 16. In the receive mode, returned signals intercepted by the antenna 16 are carried by way of line 62 to the duplexer 60 and thence through duplexer line 68 to the input of a receiver 70. This input signal is fed to a standard microwave crystal detector 72, the output of which is filtered by bypass compactior 74 and bypass resistor 76 and is fed to a commercial low-noise audio preamplifier 78. The output of amplifier 78 is fed through an RC filter network comprising a series compacitor 80 and a shunt resistor 82 which provide range equalization to reduce the dynamic range that must be handled by succeeding stages. The equalized signal is applied to an adjustable gain amplifier 84 which serves as a line driver, the output of which terminates in a coaxial fitting 86 for connection to the data processor which is used with the system to isolate the signals representing moving targets, or intruders, within the area being protected. The details of transmitter-receiver circuitry presented above are exemplary. Any transmitter capable of providing at least 25 milliwatts power output in one of the frequency bands allocated or employed for intrusion detection and further capable of linear frequency deviation of the order of 10 to 100 MHz in accordance with a sawtooth or triangular wave would be suitable.

Figure 4:
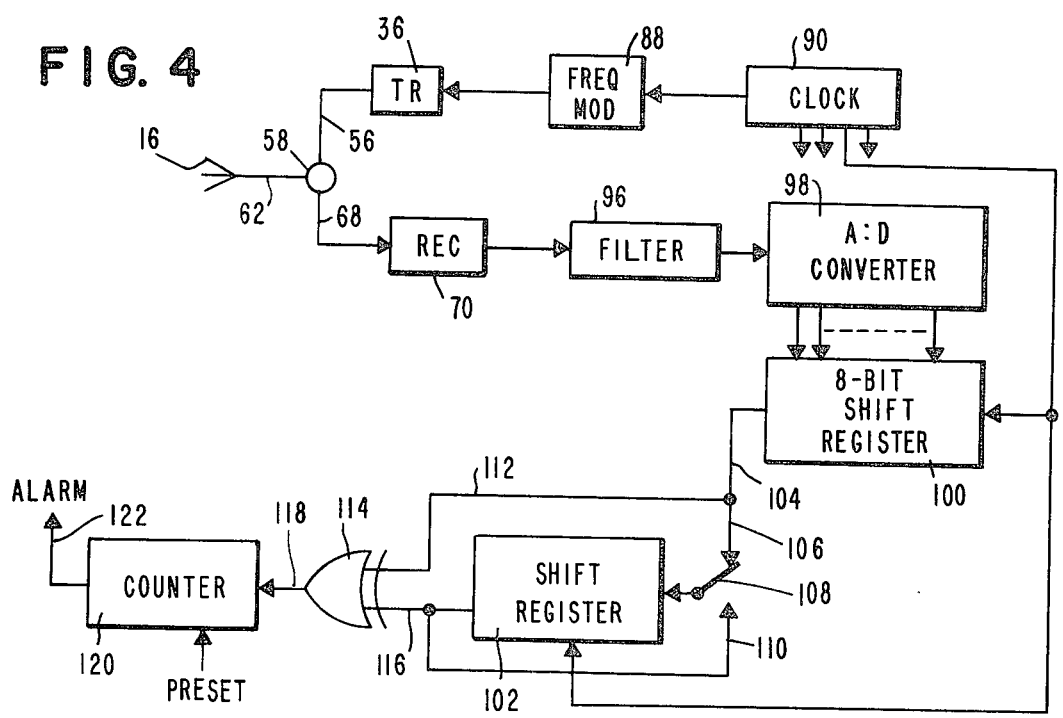
FIG. 4 is a logic block diagram of a signal processor for isolating received return signals from the transceiver which represent moving targets.
Figure 5:
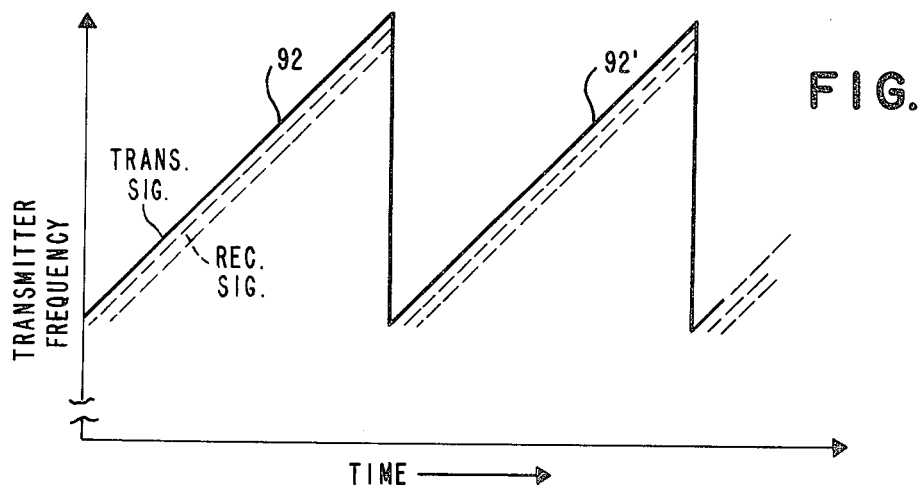
FIG. 5 illustrates the waveform of the frequency sweep of the system of FIG. 4.

Processing of the received signal is carried out in the circuitry of FIG. 4, to which reference is now made. In this illustration, the transmitter 36 is shown to be frequency modulated with a sawtooth wave by means of a suitable frequency modulator 88 which is driven by synchronizing signals received from a clock circuit 90. It will be noted that some of the transmitted energy is received directly by the receiver and the receiver mixer, or demodulator 72 (FIG. 3), demodulates the received signal, using the transmitter signal as a local oscillator. The received signal at any instant corresponds in frequency to the transmitted signal a short time before, the time difference being that required for a signal to propagate to a target and return. Since the transmitter frequency is continuously changing during the course of each FM sweep, as indicated in the waveform 92 of FIG. 5, the signal received from any target will differ from the frequency of the signal being emitted by the transmitter at that instant, the difference being proportional to the range of the target. If the rate of change of transmitter frequency, represented by the slope of waveform 92, is constant for a given sweep, as will be the case if the modulating wave is a sawtooth, the difference, or beat frequency, corresponding to a stationary target at the output of receiver 70 will be constant. If the volume or area illuminated by the transmitter beam 23 contains a number of stationary targets, the receiver output will contain a frequency component corresponding to each such target, and the specific frequency of that component will be proportional to the target range. Thus, the output of receiver 70 will be a complex audio frequency wave which will remain constant in amplitude and phase from sweep to sweep as long as there are no moving targets within the area of interest.

If the volume being surveyed contains a moving target, the audio frequency component corresponding to the range of that target will be shifted by the Doppler effect but in addition, the range frequency at which that target appears in the receiver output complex waveform will change from sweep to sweep as the target moves closer or further away. As the Doppler shift is proportional to the carrier frequency of the transmitter signal, and the range frequency is proportional to the modulation deviation, it is possible by judicious choice of carrier frequency and modulation frequency to make the Doppler and the range components of widely different frequencies, thus allowing the Doppler components to be effectively eliminated from the output signal at the receiver by audio filtering. This elimination of Doppler effects is a requirement of the present system and is accomplished by making the rate of change, or slope, of the modulating signal DF/DT comparable to the carrier frequency.

Figure 6:
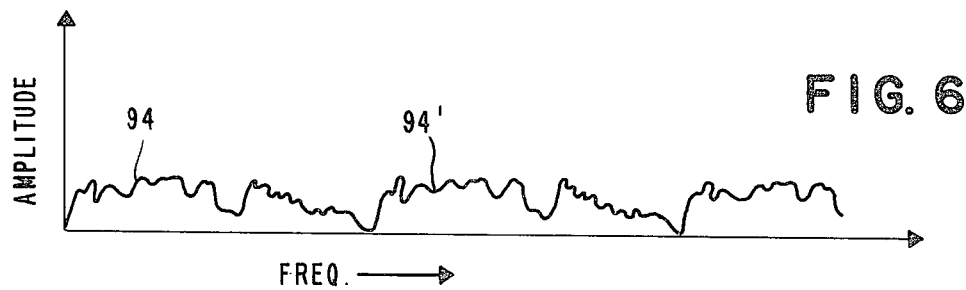
FIG. 6 illustrates a typical return waveform received by the system of FIG. 4.

FIG. 6 illustrates at 94 the waveform of a return signal as it appears at the output of receiver 70 for a particular area being surveyed. The waveform 94 contains a series of peaks, each of which represents a target at a particular range; i.e., at a particular difference frequency between the return signal being received and the signal currently being transmitted at a given instant, with the amplitude of a particular peak being dependent upon the range and reflection characteristics of its corresponding target. Thus the ensemble of audio tones represented by waveform 94 presents a picture of the various targets within the area protected by the system, while waveform 94' of FIG. 6 similarly is a picture of the target area for a subsequent sweep 92' of the transmitter. If no target has moved within the area being surveyed, waveform 94' will be identical to waveform 94. On the other hand, if one of the targets has moved between the first and second sweeps, its range with respect to the transmitter-receiver will have changed, the time required for the transmitted signal to be returned will have changed, and thus the frequency representing that target will have changed. Consequently, the complex waveform 94' will be different than the waveform 94. By detecting this change, the presence of a moving target; i.e., an intruder, can be detected. This is accomplished in the present system by feeding the output of the receiver 70 to a suitable filter network 96 (FIG. 4), which may take several forms, to a data processor, where a number of functions are performed.

Filter 96 may incorporate the RC network 80, 82 of the receiver so as to provide a sloping characteristic which provides range equalization. Since the strength of a radar return signal decreases 12*db* each time the range is doubled, the filter may be designed to have an output which increases with frequency at the rate of 12*db* per octave from DC to an adjustable upper cutoff frequency in the audio range. The effect of this sloping characteristic is to make the system equally sensitive to targets at all ranges up to the range corresponding to the upper cutoff frequency; above the cutoff frequency, the filter transmission characteristics decreases abruptly in accordance with well known principles of low pass filter design. Since this negative slope characteristic of the filter decreases return signal strength for targets beyond a certain range, the total effect is to make the system equally sensitive to all targets up to an adjustable maximum range and very insensitive to targets beyond this range. The sloping characteristic of the filter also attenuates noise components near the transmitter frequency. Alternatively, filter 96 may be designed to have pronounced nulls or peaks at selected frequencies to make the system insensitive to targets at particular ranges or more sensitive to targets at selected ranges. Finally, the filter characteristic may be made to vary with some other parameter than range, such as antenna orientation, to produce sensitive area or zones of various geometric shapes.

Returning to FIG. 4, the data processing portion of the system includes an analog to digital converter 98 which samples the output of filter 96 thirty-two times, or some other convenient number of samples consistent with the frequency content of the return wave and the need for reliable detection of desired targets, for each sweep of the modulator 88, the amplitude of each of the 32 samples being converted to an 8 bit digital number by the converter. The 8 bit number representing each sample is fed in parallel to an 8 bit shift register 100 and is clocked in series out of shift registor 100 into a 256 bit shift register 102 by clock 90. This is repeated for each sample of the sweep so that the 8 bit bytes describing the content of one sweep (that is, describing the complex waveform 94) are read serially into shift register 102 as the sweep progresses to produce a 256 bit word describing the waveform. The output of shift register 100 is fed by way of line 104 and line 106 through a switch 108 to the input of register 102. At the completion of a first sweep, switch 108 is shifted to line 110 which is a recirculating line for shaft register 102, whereby the contents of the shift register are recirculated on subsequent sweeps of the modulator. It will be understood that the shifting of switch 108 is accomplished by clock 90, and that in practice the switch would be pair of AND gates shifted by the clock at appropriate intervals in a manner well known in logic system design. On subsequent sweeps, such as the sweep 92', the output from the analog to digital converter 98 is shifted by clock 90 through line 104 and line 112 to one input of an exclusive OR circuit 114. At the same time, the shift register 102 is driven by clock 90 in synchronism with shift register 100 to supply the previously stored data from shift register 102 by way of line 116 to a second input of the exclusive OR gate 114 for comparison on a bit by bit basis with the output of shift register 100. Thus, the sampled values of the current, or ongoing, waveform 94' is compared with the sampled values of the previously stored waveform 94 and as long as the compared bits are alike, the exclusive OR gate 114 will produce no output. If any compared bits are different, the OR gate 114 produces an output signal on line 118 which is fed to a counter 120 and is accumulated there. Error counter 120 may be present so that an alarm output signal will be provided on its output line 122 whenever a specified number of error counts are accumulated.

If there are no moving targets in the protected area, there will be no change in the output of the shift register 100 from one sweep to the next, and therefore the recirculating data within shift register 102 will be the same as the data currently being processed and there will be no error counts. If a slowly moving target is present, one of the frequency components in the audio waveform 94' will gradually change. This change may not be sufficient to produce a measurable discrepancy between successive sweeps, but if the contents of shift register 102 are recirculated many times, for example, until the target has moved ¼ of a wave length, the exclusive-OR gate will produce a large number of error counts, resulting in an alarm.

It will apparent that the contents of the shift register 102 may be periodically updated by shifting switch 108 back to line 106 to receive the output of shift register 100, after which the switch is returned to its recirculating position for further comparisons. The frequency with which the shift register 102 is updated will depend upon the minimum velocity that is to be detected by the system. If very slow movements are to be ignored, the shift register 102 may be updated more frequently; on the other hand, if it is desired to detect very slow movements, the contents of the shift register 102 may be recirculated for a longer period of time.

Figure 7:
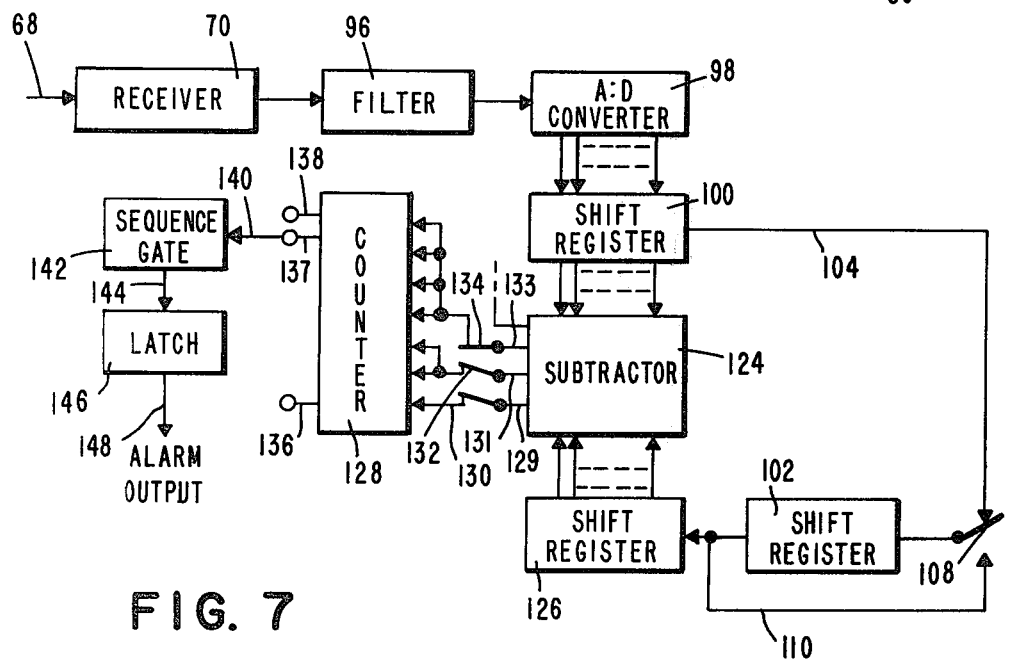
FIG. 7 is a logic block diagram of a modified version of the processor of FIG. 4, providing a weighted error recognition.

The system described in FIG. 4 is an unweighted system; that is, the exclusive OR gate does not distinguish between the minor descrepancies represented by changes in the least significant bit of the analog to digital converter output and the larger motions in the target area represented by changes in one of the more significant bits. Such an unweighted system is relatively vulnerable to electrical noise, vibration, and the like. A more generally useful system in which bit weighting is preserved is illustrated in FIG. 7, to which reference is now made. In this Figure the transmitter portion of the system is not illustrated since it is identical to that of FIG. 4. Similarly, the receiver 70, filter 96 analog-to-digital converter 98, shift register 100, shift register 102, switch 108 and recirculating line 110 are also identical to those of FIG. 4 but are shown for clarity. In this system, changes in the received signal are weighted so that changes in the most significant digits of the 8 bit words for each sampling will produce a larger response in the error counter than will changes in the least significant digits. To accomplish this, comparison is made on a word by word basis, rather than on a bit by bit basis, and this comparison is performed in a subtractor, the output of which is fed to an error counter on a weighted basis. Thus, the output of shift register 100 is fed by way of line 104 and switch 108 to the 256 bit shift register 102 during a first sweep in the manner already described. During a second sweep, such as the sweep 92', however, the output of shift register 100 is fed in parallel to a subtractor, or comparator, network 124. The content of shift register 102 is not only circulated by a clock circuit around recirculation line 110, but also is fed into a second 8-bit shift register 126, instead of into an exclusive OR gate. When the number of bits corresponding to a byte have been shifted into register 126, the contents of that register are fed in parallel to the subtractor 124 where they are compared on a bit-by-bit basis with the contents of shift register 100 on an absolute value basis. This subtractor, the details which will be described below, subtracts the contents of shift register 100 from the contents of shift register 126 and at the same time subtracts the contents of register 126 from the contents of register 100, selecting for an output for each bit whichever of these differences results in positive number.

The parallel output from subtractor 124 is applied to the inputs of a counter 128 in a manner such that the least significant bit of the subtractor output is given a weight of 1, the next more significant bit a weight of 2, the next a weight of 4, and so on. This weighting is illustrated in FIG. 7 as being obtained by connecting the output line 129, which carries the least significant bit of interest, from subtractor 124 through a switch 130 to a single input of counter 128, an output line 131 carrying a second bit from subtractor 104 being connected through a switch 132 to two inputs of counter 128, a line carrying a third most significant bit of the output of subtractor 124 being connected through a switch 134 to 4 inputs of counter 128, and so on. In this manner, an output on line 129 representing a difference between the least significant digits in the signals being compared by subtractor 124 would introduce only a single count to counter 128, while a signal on line 133, for example, representing a more significant difference between the values in shift registers 100 and 126 will produce a count of 4. In this way, more significant changes in the targets being monitoring by the present system produce greater counts and thus are more sensitive to alarm conditions than minor changes which might be due to very slow motion near the threshold of sensitivity for the system, or the like. The switches 130, 132, 134 give the system great flexibility by permitting selected less significant digits to be ignored by the system. Elimination of the least significant bit, for example, allows the system to disregard the occasional error bits which may result when the analog-to-digital converter is operating very near the transition level. Elimination of the next higher order bit is sometimes helpful in coping with difficult environments such as those containing vibrating machinery, small animals, etc. which are to be ignored. Higher level switches such as the switch 134 may be provided if desired, but generally will not be necessary.

Counter 128 may be provided with a plurality of output terminals such as those illustrated at 136, 137 and 138 which produce output signals at various predetermined count levels. A switch arm 140 permits selection of the desired count level which will produce an alarm, and the selected output is connected to a sequence gate 142. The sequence gate is a latching-type network which will produce an output only when the alarm level selected by switch 140 is reached in the counter 128 on two successive transmitter frequency sweeps. If the second sweep following an alarm condition does not reach the alarm threshold, the sequence gate is cleared and no alarm signal is produced, thereby protecting against error signals caused by electrical noise or the like. When two alarm signals are received in succession, the sequence gate produces an output signal on line 144 which activates a latching network 146 to produce the actual alarm output on line 148. The latch 146 insures that the alarm signal is transmitted for some predetermined time once the sequence gate 142 has been activated.

It will be understood that the shift register 102, which contains the 256 bit word describing the reference waveform, may be updated periodically in the manner described with respect to FIG. 4. Further, during subsequent comparison sweeps the shift register 102 is advanced in a recirculating mode under the control of switch 108, with the contents of the register being also shifted into register 126 for the byte by byte comparison of 8 bit samples received by the shift register 100 from the analog-to-digital converter.

Figure 8:
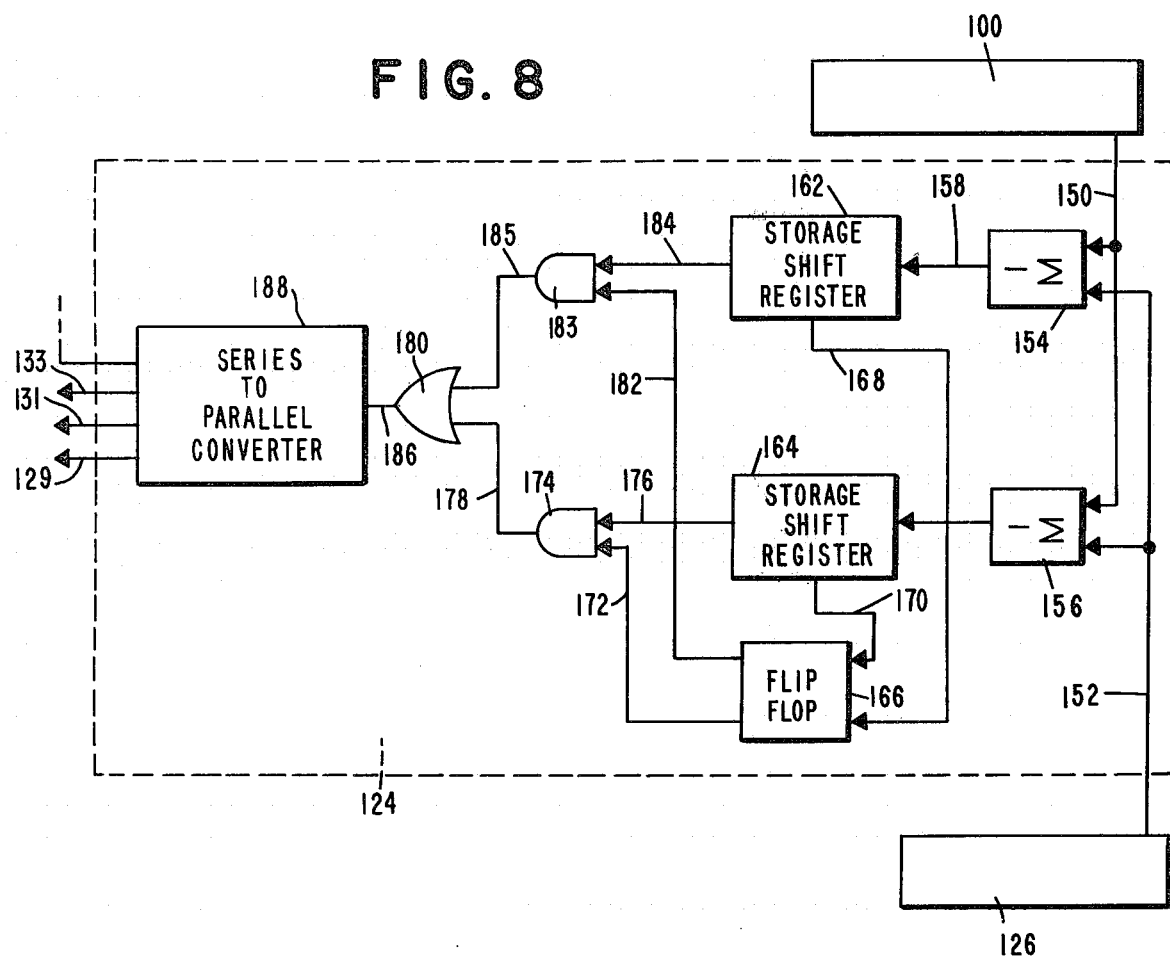
FIG. 8 is a logic diagram of an absolute value subtractor suitable for use in the processor of FIG. 7.

The details of an absolute-value substractor such as that utilized at 124 in FIG. 7 are illustrated in FIG. 8. As shown, the individual bits from shift registers 100 and 126 are fed serially by way of lines 150 and 152, respectively, to corresponding inputs of a pair of conventional subtracting networks 154 and 156. Corresponding bits are fed simultaneously, but in the opposite sense, so that the output of subtractor 154 is the contents of register 100 minus the contents of register 126, while the output of subtractor 156 is the contents of register 126 minus the contents of register 100. Depending on which of the contents is the larger, one of the two subtractor outputs on lines 158 and 160 will be positive, the other negative. These bit-by-bit subtractions are accumulated in registers 162 and 164, respectively; the laws of binary subtraction show that the positive difference will have a zero as its most significant bit, while the negative difference will have a one as its most significant bit (provided that the difference between the two numbers is less than $2^8$, which is always true in practice). The most significant bit of each register is sensed by flipflop 166 by way of input lines 168 and 170. If the most significant bit of register 162 is 1, indicating a negative difference, flipflop 166 is reset, producing a 1 on its output line 172. This enables an AND-gate 174, allowing the contents of register 164 to be shifted out by way of line 176, AND gate 174, line 178, and OR gate 180 for further processing. The resetting of flipflop 166 produces a 0 on its output line 182 which inhibits AND gate 183 and the contents of register 162. If, on the other hand, the contents of register 162 is positive, its most significant bit will be 0, and the most significant bit of register 166 will be 1. This sets the flipflop 166, enabling AND-gate 183 and the contents of register 162 are shifted out by way of line 184, gate 183, line 185 and OR gate 180 for further processing. The resetting of flipflop 166 also serves to inhibit gate 174 and register 164.

The serial output of OR gate 180 is the data word from either register 162 or register 164 which represents as a positive value the difference between the data word contents of registers 100 and 126. The output of gate 180 is applied by way of line 186 to a series to parallel converter 188 which converts the series data word from either register 162 or register 164 to a parallel data word. The output of converter 188 appears on lines 129, 131, 133, etc. of the subtractor 124 for application to the weighting counter 128 of FIG. 7, as previously described.

Figure 9:
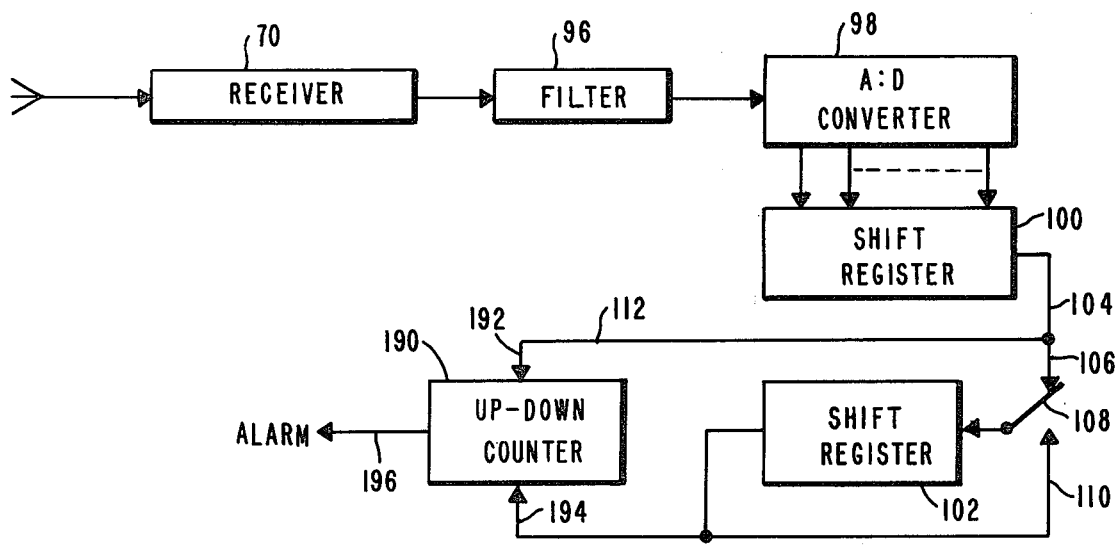
FIG. 9 is a logic block diagram of another modification of the present invention.

FIG. 9 discloses another method of implementing the comparison function described with respect to FIGS. 4 and 7, this modification being especially useful when unidirectional target motion is to be detected in the presence of periodic motion of clutter targets such as swaying tree branches. All the components of this system are the same as those of FIG. 4, except that an up-down counter 190 is substituted for the exclusive-OR gate 114. The up-down counter is a reversible counter which will count in both the positive and negative directions, depending on which input line receives a 1 signal. Thus, the serial output from shift register 100 may be applied by way of lines 104 and 112 to the up input 192 of counter 190 while the serial output on line 110 from shift register 102 may be applied to the down input line 194 on counter 190. Thus, in comparing a stored word in register 102 with a current word in register 100, differences will be registered in counter 190 on a bit by bit basis, with the counter advancing when the signal on line 112 is larger and reversing when the signal on line 110 is the larger, but remaining unchanged when both signals are the same. In this manner, periodic motion sensed by the shift register 100 will in one sweep cause the counter 190 to count up, for example, and in a subsequent sweep cause the counter to count down, with the total count over a period of time cancelling itself to produce no output for periodic motion. However, the system remains sensitive to unidirectional motion and when the counter reaches a predetermined threshold count in the normal manner, it will produce an alarm signal on its output line 196. This system is useful in eliminating the effects of periodic motion having an amplitude less than the threshold alarm value and assists in preventing false alarms. It will be evident that the weighting principles described in connection with FIG. 7 may also be employed with the system in FIG. 9, if desired.

Figure 10:
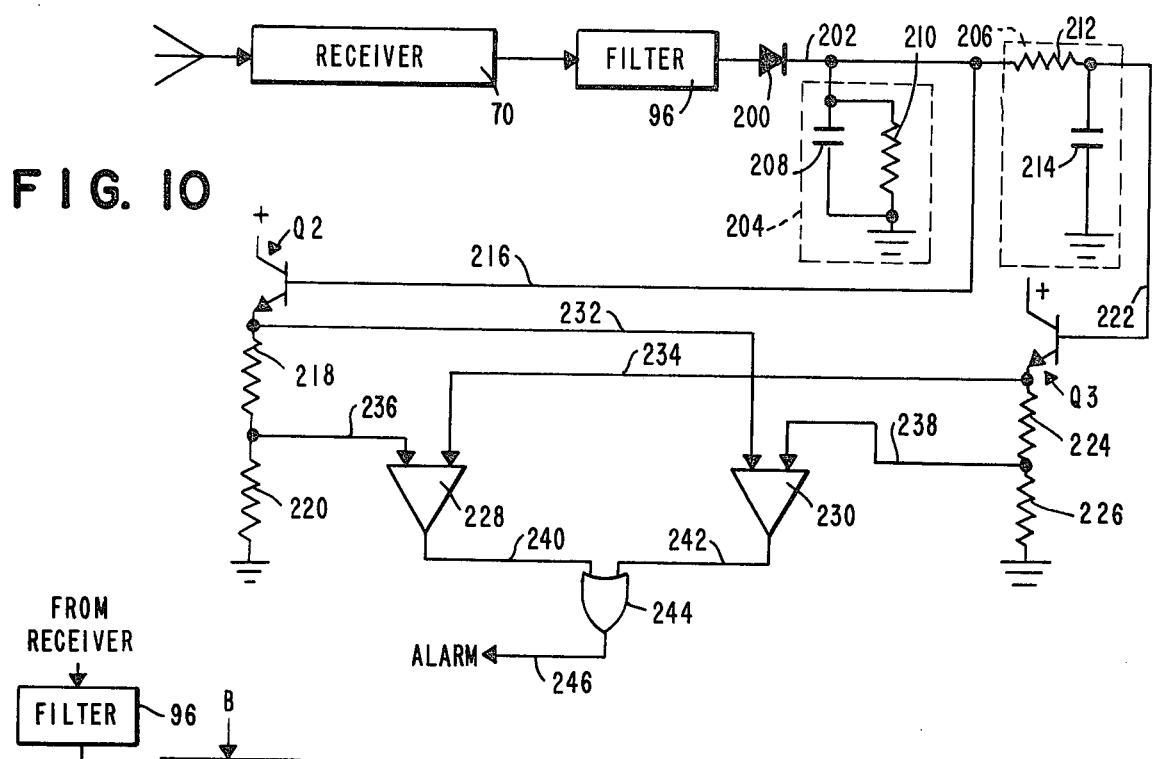
FIG. 10 is a logic block diagram of an analog implementation of the present invention.

Although the embodiments of the invention thus far discussed have been described in terms of digital logic circuitry, it will be apparent that the present system may be implemented through analog techniques, as illustrated in FIG. 10. Again, the transceiver portion of the system, including receiver 70 and filter 96 are the same as prior embodiments. However, in this case the output of the filter is fed through a diode 200 by way of a line 202 to a pair of RC networks 204 and 206. The first RC network comprises a capacitor 208 and resistor 210 connected in parallel between line 202 and a ground point, while RC network 206 comprises a series resistor 212 and a shunt capacitor 214. With this arrangement, capacitor 208 is charged through diode 200 by the output of filter 96 during the course of each sweep. The capacitor 214 is also charged by the diode, but more slowly because of the presence of resistor 212. When successive sweeps result in identical receiver output, as will be the case when there is no motion in the protected area, the capacitors 208 and 214 will stablilize at equal voltages, but when there is a difference between successive sweeps, their voltages will be different.

The voltage across capacitor 208 is applied by way of line 216 through an isolating transistor Q2 and thence across a voltage divider comprising series resistors 218 and 220. In similar manner, the voltage on capacitor 214 is applied by way of line 222 through an isolating transistor Q3 to a second voltage divider comprising resistors 224 and 226. The transistors may be field effect transistors and their outputs are cross-connected to a pair of differential amplifiers 228 and 230; that is, the emitter of Q2 is connected by way of line 232 to one input of amplifier 230 and the emitter of Q3 is connected by way of line 234 to one input of amplifier of 228. The junction of resistors 218 and 220 is connected by way of line 236 to the second input of differential amplifier 228 and the junction between resistors 224 and 226 is connected by way of line 238 to the second input of differential amplifier 230. The outputs of amplifiers 228 and 230 are connected by way of lines 240 and 242, respectively, to an OR gate 244 which provides an alarm signal on line 246 in the presence of an input signal.

The voltage dividers are proportional so that the inputs to the differential amplifiers 228 and 230 are equal and opposite in their equilibrium condition, where successive sweeps result in identical receiver output and equal voltages on capacitors 208 and 214. When there is motion in the protected area, however, the peak value of the received signal will change. Capacitor 208 will immediately readjust itself to the new level, but capacitor 214 cannot immediately do so because of the damping effect of resistor 212. Depending upon whether the peak value of the newly received signal is higher or lower than the prior equilibrium value, one or the other of the differential amplifiers will produce a positive output on one of lines 240 and 242, thereby activating an alarm by way of the OR gate 244 and its output 246. Although the analog system illustrated in FIG. 10 is less sensitive than the digital method previously described, it will be seen that this system is very simple and inexpensive, requiring no clock circuits for operation, except in the transmitter, and thus may in some situations be advantageous.

A more complex analog system may utilize sample and hold circuits with an appropriate reset system for use in place of the RC circuits 204 and 206. In this case, the voltage across capacitor 214 would be sampled and held for a predetermined number of sweeps and compared with the new value at capacitor 208 once each sweep. As before, a change in a target in the protected area would result in a change in the voltage across capacitor 208 which, when compared with the value being held by the sample and hold circuit, would excite the differential amplifiers to produce an alarm output. This arrangement requires the use of timing circuits, but produces improved sensitivity in the analog system.

Figure 11:
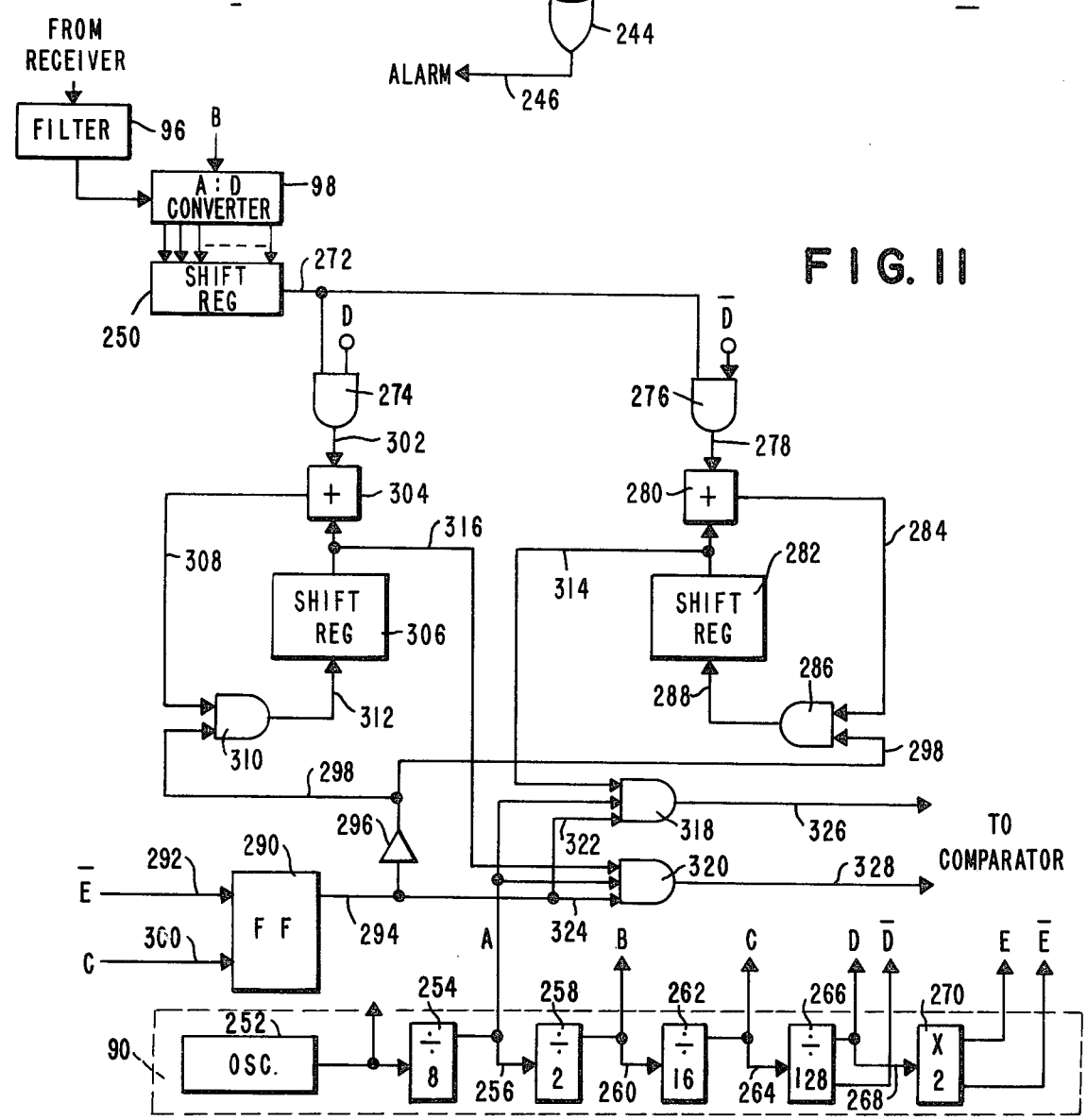
FIG. 11 is a logic block diagram of a modified form of the processor illustrated in FIG. 4, providing averaging of a large number of sweeps for comparison.

In order to provide improved protection against periodic noise or clutter appearing within the region to be protected, as, for example, where there is a vibratory motion due to a machine or perhaps tree motion due to the wind blowing, it may be desirable that a system be provided which is capable of averaging out such motion over a relatively large number of transmitter sweeps. Such a system is illustrated in FIG. 11, wherein circuits are provided to average a large number of sweeps, store the results for later use, average a second large number of sweeps, store that result, and then compare the stored signals. Such a system serves to povide an improved signal-to-noise ratio, is suitable for particularly exacting environments, and is more effective in this regard than the up-down counter described with respect to FIG. 9.

Again, the transceiver portion of the system is similar to that of prior described embodiments, with the receiver output being provided through a filter 96 to an analog-to-digital converter 98. However, the output of converter 98 is applied in parallel to a 16-bit shift register 250 which is connected to converter 98 in such a way that the first (most significant) eight bits of each 16-bit word are always 0. The analog-to-digital converter 98 is driven by an output B of the system clock 90. As illustrated, the clock 90 comprises an oscillator 252, the output of which is fed through a series of dividers to produce outputs at selected counts, which outputs may be used to drive appropriate portions of the circuit. The construction of such clock networks is well known, but for illustrative purposes a typical arrangement usable with the system of FIG. 11 may include a first divider network 254 which receives pulses from oscillator 252 and produces a single output on clock terminal A for each eight oscillator pulses. The output of divider 254 is applied by way of line 256 to the input of a second divider network 258 which produces a single output pulse for each two input pulses, and thus serves to divide the oscillator frequency by 16. The output from network 258 is available at clock output terminal B and is also fed by way of line 260 to a third divider network 262. The latter network divides the pulses on line 260 by 16, thereby producing at clock terminal C an output for each 256 oscillator pulses. The output appearing on terminal C is also applied by way of line 254 to a divide by 128 network 266, the output of which appears on output terminal D and the complement of which appears on output terminal $\overline{D}$. The signal appearing on terminal D is applied by way of line 268 to the input of a final divide by 2 stage 270 which produces an output signal on line E and its complement on terminal $\overline{E}$. Initially, the outputs appearing on clock terminals A, B, C, D and E are 0 and the outputs on terminals $\overline{D}$ and $\overline{E}$ are 1, with the pulses from oscillator 252 driving the networks to shift the output signals on these terminals in accordance with the particular divider network characteristics.

The analog-to-digital converter 98 operates as in the prior embodiments of the invention described with the respect to FIGS. 4 and 7 to sample the waveform produced by the filter 96 and to convert the amplitude of each sample to an 8-bit digital word. This word is fed in parallel to the shift register 250, and the words so stored in the shift register are then clocked out by the pulses on terminal B as 16-bit words, of which the 8 most significant bits are always 0. The serial output from shift register 250 is fed by way of line 272 to one of the inputs of each of a pair of AND gates 274 and 276. The second input to gate 274 is the signal appearing on the D terminal of clock circuit 90, while the second input to AND gate 276 is the $\overline{D}$ signal from clock 90. Since initially the $\overline{D}$ terminal is one, the signals appearing on line 272 will be fed by way of AND gate 276 through line 278 to a one-bit full adder 280. Also applied to adder 280 is the output of a 256 bit shift register 282 which is driven by the clock network 90 to shift its contents serially into adder 280 on a bit by bit basis. The output of adder 280 is applied by way of line 284 to one input of an AND gate 286 connected in a recirculating loop, whereby the output of gate 286 is fed into the shift register 282 by way of line 288. The second input of AND gate 286 is derived from a flipflop network 290 which initially is held in its set condition by the 1 output appearing on the $\overline{E}$ terminal of the clock circuit, which input is applied by way of line 292 to the setting input of the flipflop. In the set condition, the output line 294 of the flipflop is in the 1 condition, which output is fed through line 294 to an inverter 296 which converts the 1 signal to a 0. The output of inverter 296 is applied by way of line 298 to the AND gate 286, holding the latter gate in its non-conductive condition. Accordingly, the output of the adder 280 initially is prevented from reentering shift register 282.

The shift register is driven by the oscillator 252 output, with 256 pulses being sufficient to read out the complete contents of the 256 bit register 282. Since any input to the register was inhibited during this period by gate 286, the register 282 will contain all zeros at the end of the 256th count. At that count, clock terminal C produces a signal which is applied by way of line 300 to reset flipflop 290. The signal of flipflop output 294 then becomes 0, is inverted, and enables gate 286 to be accumulated in shift register 282. During the next following 256 clock pulses, the 0's in register 282 are added bit by bit to the current input being received by way of shift register 250 and gate 276, thereby storing 16 words, each of which has 16 bits, from register 250. Thus the register 282 accumulates a digital word description of a frequency sweep of the transceiver. In the next sweep, the contents of shift register 282 are added to the new data received through gate 276 on a bit by bit basis in adder 280 and this sum is recirculated back into register 282. After 128 sweeps, for example, the register 282 will contain the binary sum of the sample words recorded during that period of time; that is, the 16-bit word which described each sample of the receiver output has been added to the analogous word of a later sweep 63 times. Carried digits resulting from this adding process are accomodated in the register by the fact that the eight most significant digits of each new 16-bit word from register 250 are 0.

After 128 sweeps, or 32,768 clock pulses, clock gate 266 is shifted and the D output terminal goes to 1 while the $\overline{D}$ output terminal goes to 0, thus disabling gate 276. The 1 appearing on terminal D enables gate 274, the output of which is applied by way of line 302 to a second adder 304. Again, a second input to adder 304 is provided by a 256 bit storage shift register 306, with the output of the adder being applied by way of line 308 in a recirculating loop to an AND gate 310 and thence through line 312 back to register 306. The second input to AND gate 310 is connected to the output of flipflop 290 by way of inverter 296 and line 298 and operates in the manner of AND gate 286 to control the recirculating loop for shift register 306. Accordingly, upon enabling of gate 274, the shift register 306 is cleared and its contents are thereafter added to current sweep samples for 128 sweeps. At the conclusion of the second 32,768 clock pulses, register 282 contains the sum of the samples derived from the first 128 sweeps and register 306 contains the sum of the samples derived from the next 128 sweeps. To convert both of these sums to averages, it is necessary to divide each by the number of sweeps. Since the number of sweeps is an integral power of two, this is readily accomplished by stepping the decimal place seven digits to the left (since 128 equals 2 to the 7th power). In the present embodiment, it is convenient to set the decimal place eight digits to the left in each of the storage shift registers 282 and 306 in order to eliminate the least significant bit in each of the average values.

The outputs of shift registers 282 and 306 are fed by way of lines 314 and 316, respectively, to corresponding output AND gates 318 and 320. Also applied to inputs of each of gates 318 and 320 is the output from the A terminal of clock 90, which output goes to 1 on alternate counts of 8. The last input to each of gates 318 and 320 is the output from flipflop 290 which is applied by way of line 294 and lines 322 and 324 to the gates.

In operation, the shift register 282 is cleared by the presence of the $\overline{E}$ signal to set flipflop 290 which presents a 0 at the inputs to AND gates 286 and 310 and prevents recirculation of the count in registers 282 and 310. The presence of a D signal at gate 276 allows digital signals representing the received waveform to be applied to adder 280. At the end of a count of 256 pulses, the flipflop 290 is reset at terminal C and the shift register 282 begins to accumulate a count. At a count of 16,384 pulses, the last stage 270 of the clock shifts to produce a 0 on the E terminal. At 32,768 pulses the last stage 270 resets, producing a 1 on the $\overline{E}$ terminal to set flipflop 290 and disable the AND gates 286 and 310. At the same time, gate 274 is enabled by the $\overline{D}$ terminal of the clock and shift register 306 is cleared until a pulse appears on the C terminal of the clock which agains resets the flipflop 290. This enables gate 310 and shift register 306 begins to accumulate. At the end of the second 32,768 clock pulses, gate 274 is disabled and gate 276 is enabled, flipflop 290 is set to inhibit gate 286, and shift register 282 is cleared. Again, after 256 additional counts, flipflop 290 is reset and shift register 282 begins to accumulate. This operation continues, providing in the registers 282 and 306 accumulated values representing long-term averages of the received waveforms.

The contents of shift registers 282 and 306 may be read out through gates 318 and 320, respectively, whenever flipflop 290 is in the set condition, between the time that a set pulse is applied from the $\overline{E}$ terminal, and a reset signal is applied from the C terminal, and whenever divider network 254 is set to produce a 1 on terminal A, which occurs in alternate 8 bit intervals. The transition of the $\overline{E}$ terminal to a 1 condition and the alternate 8 bit enabling operation of terminal A causes the word being shifted out of shift registers 282 and 306 to adders 280 and 304, respectively, to also be read out of the registers by way of lines 314 and 316, gates 318 and 320 and output lines 326 and 328. By reason of the alternating inhibiting action of the signal on terminal A, only the eight most significant bits of each 16 bit word fed out of the shift registers is allowed to pass through the gates 318 and 320, while the eight least significant bits are suppressed by a 0 signal on terminal A. Thus, the desired averaging is accomplished by passing the eight most significant bits of the accumulated words in the shift registers 282 and 306 to the output lines 326 and 328. The signals appearing on these lines may be compared to each other to determine whether there were any changes in the received waveforms over the respective periods of time. This comparison may be carried out in any of the comparator networks described hereinabove.

It will be apparent that in place of the simple divide-by-eight network provided in the clock circuits, counters of various types may be provided to produce a fewer or greater number of significant digits in the averaged output and to permit averaging of any integral number of sweeps.

Figure 12:
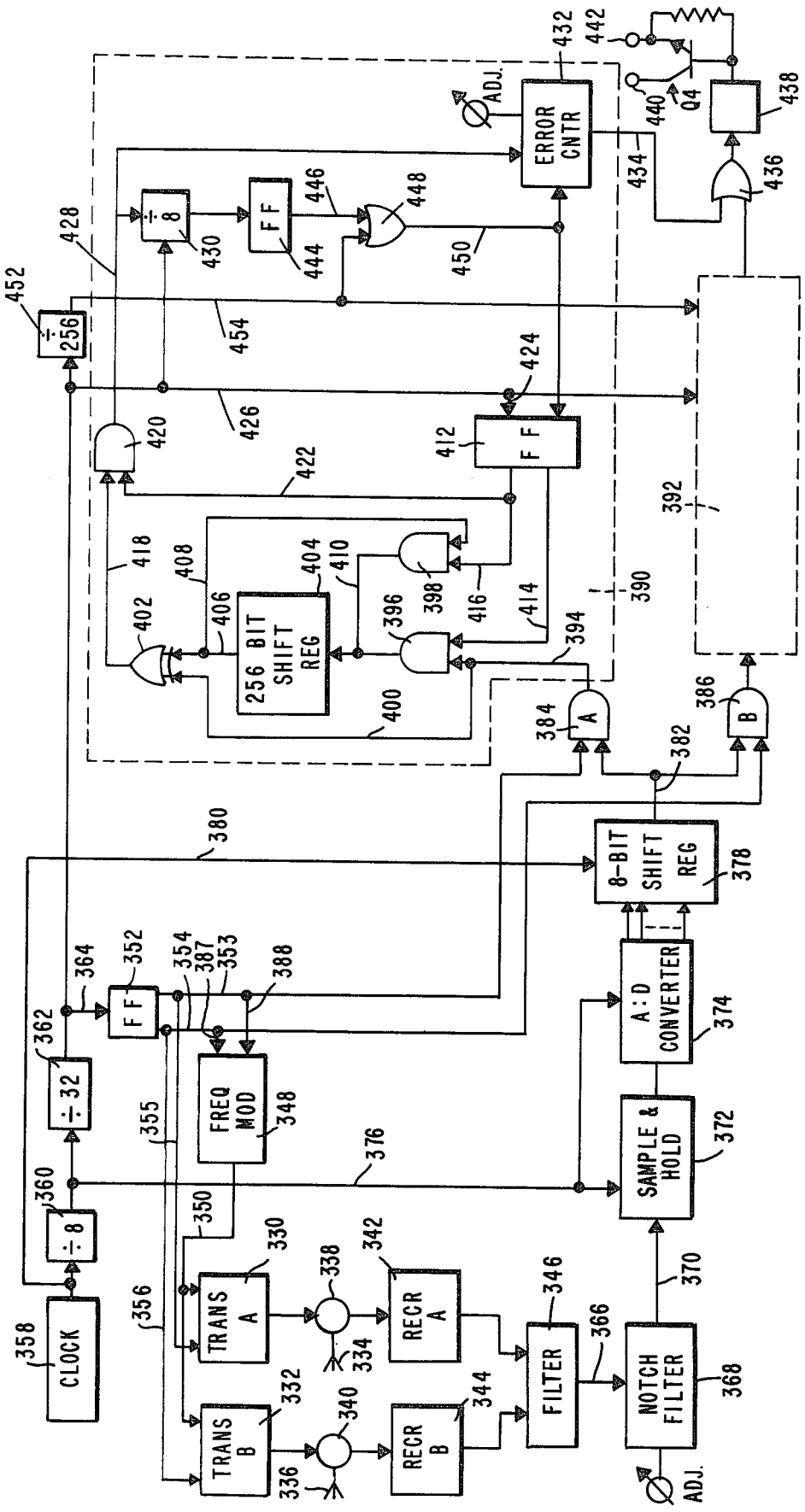
FIG. 12 is a logic block diagram of a multiplexed version of the processor of FIG. 4.

In some situations it may be found desirable to utilize two intrusion detectors either in adjacent but overlapping areas to be protected or to protect a single area from different angles, as where there are large shadow areas. When two systems are used in this manner, it is convenient to utilize a common time-shared digital data processing system in accordance with the present invention by operating the transmitters on alternate cycles of modulation and processing the received signals to separate storage registers. For a system using two storage registers in this manner, the registers are gated alternately so that each transmitter-receiver system is compared with its own delayed record. Such a system is illustrated in FIG. 12, to which reference is now made. This figure is a simplified logic block diagram of the system and is shown as having a pair of transmitters 330 and 332 each of which is similar to the transmitter 36 of FIG. 3. The transmitters drive their respective antennas 334 and 336 through duplexers 338 and 340, with received signals being directed by the duplexers to corresponding receivers 342 and 344. The receivers are similar to that illustrated at 70 in FIG. 3 and again have their outputs directed to a filter element 346 which may be the low path filter which establishes the maximum range to which the system will respond and may be similar to the filter 96 illustrated in FIG. 4. It will be noted that the receivers 342 and 344 may be a common receiver adapted to receive signals transmitted by the respective antennas 334 and 346, if desired.

Transmitters 330 and 332 are driven by a frequency modulator 348 by way of line 350 which is connected to their modulating input terminals, which correspond to terminal 46 in the illustration of FIG. 3, for providing the desired frequency sweeps of the transmitter sawtooth outputs. The selection of transmitters 330 and 332 for alternate operation is by way of a flipflop network 352, the outputs of which are connected by way of lines 354 and 356 to the input terminals, corresponding to terminal 48 of transmitter 36 in FIG. 3, of the two transmitters 330 and 332, respectively. The flipflop 352 is driven by the system clock 358 by way of a divide by eight network 360, a divide by 32 network 362, and line 364.

The output of filter 346 is a pair of alternate waveforms representing the electromagnetic wave profiles, or pictures, of the two areas being monitored by the two transmitters. The waveforms from this filter are applied by way of line 366 to notch filter 368 which is continuously adjustable to null out selected frequency signals which may be caused by a specific source of moving clutter such as a vibrating machine. If desired, additional notch filters may be provided to selectively eliminate the return signal from specific clutter sources.

After filtering, the signal is applied by way of line 370 through sample and hold circuitry 372 which cooperates, as discussed above, with an analog-to-digital converter 374 to periodically sample the received waveform and to convert each sample amplitude to an 8 bit word. In this embodiment, it is preferred that the incoming signal be sampled 4800 times per second, and for this purpose networks 372 and 374 are driven by the output of the divide by 8 network 360 by way of line 376 to assure synchronization of the system. The output of converter 374 is fed as an 8 bit parallel output to an 8 bit shift register 378, the register being driven by clock circuit 358 by way of line 380 to deliver its contents in series by way of line 382 to one input of each of a pair of AND gates 384 and 386. The content of the shift register 378 is shifted out at the clock rate of 38.4 kHz. As was the case in the FIG. 4 embodiment, a result of this operation is a sampling of each frequency sweep of the selected transmitter 32 times to provide 32 8-bit bytes in the 256 bit word which completely described a single frequency sweep. Because 32 samples are required to describe a single frequency sweep, a divide by 32 scaler is used to toggle flipflop 352. This flipflop alternately energizes its output lines 353 and 354 activate the transmitters alternately by way of lines 355 and 356, as described above, and at the same time furnishes the trigger signal for the sawtooth generator 348 by way of lines 387 and 388. Finally, the signals on the output lines 353 and 354 are applied to the second inputs of the AND gates 384 and 386 to alternately activate these AND gates and to enable the serial output of the 8 bit register 378 to be fed by way of one or the other of these gates to a corresponding one of processing networks 390 or 392. Processor 390 corresponds to, and receives signals returned from, transmitter 330 while processor 392 corresponds to transmitter 332. The flipflop 352 insures that the output from shift register 378 is delivered alternately to one and then the other of processors 390 and 392 in snychronization with the shifting between transmitters 330 and 332 so that the return from each transmitter is deposited in its own data processing terminal for detection of signal variations which would indicate the presence of an intruder in their respective areas of protection.

The two target data processors 390 and 392 are identical and accordingly the details of only unit 390 will be described. The input to processor 390 is applied by way of line 394 from the AND gate 384 to one input of a switch corresponding to the switch 108 of FIG. 4. In this embodiment, the switch comprises a pair of AND gates 396 and 398, with the line 394 being connected to one input of gate 396. Line 394 is also connected by way of line 400 to one input of an exclusive OR gate 402. The output of AND gate 396 is applied to a 256 bit shift register 404, the output of which is applied to the second input of the exclusive OR gate 402. The output line 406 of register 404 is also connected through a line 408 to one input of the AND gate 398, the output of which is connected to the input terminal of register 404 by way of line 410 to form a recirculating loop. The second input to each of gates 396 and 398 is connected to a corresponding output of a flipflop 412 which alternately enables the gates by way of lines 414 and 416 to either allow new information to be fed into the shift register or to allow recirculation of information already stored.

The output of the exclusive OR gate 402 is connected by way of line 418 to one input of a gate 420, the other gate of which is connected to the output of flipflops 412 by way of line 422. The gate 420 functions to inhibit the output of the exclusive OR gate except during the time the recirculating loop of shift register 404 is operating; i.e., when gate 398 is enabled. The set input 424 of flipflop 412 is driven by the output of the divide by 32 network 362 of the clock circuit by way of line 426, whereby the flipflop is set every 256 counts.

Initially, flipflop 424 is in a reset condition, whereby a 1 signal appears on line 414 to enable AND gate 396. Accordingly, binary data from the 8 bit shift register 378 will enter the shift register 404 by way of gates 384 and 396 until flipflop 412 is set by the clock circuit. During this period of time, the exclusive OR gate 402 is producing a random sequence of ones and zeros, representing the input signal on line 394 applied to OR gate by way of line 400 and the output signals from the register 404 appearing on line 406. However, this random sequence is prevented from producing an alarm signal because the reset condition of flipflop 412 inhibits gate 420. When a 256 bit word has been loaded into register 404, flipflop 412 is set and the recirculating gate 398 and the output gate 420 are both enabled, converting the 256 bit register 404 into a recirculating memory and allowing the output of OR gate 420 to proceed further in the processing circuit.

It will be noted that at the same time that flip-flop 412 is set, the flipflop 352 is shifted to enable transmitter 332 and its corresponding AND gate 386, thereby activating target register 392 and repeating the chain of events just described. At the completion of the second 256 bit count, the second target register 392 will have been loaded with a word corresponding to the reference sample of its return signals for the second sweep, and both target registers are now loaded with a digital word representing their respective coverage areas. At the start of the third sweep, flipflop 352 reactivates the first transmitter and receiver, and return signals are fed to the target register 390. However, flipflop 412 remains in its set condition, inhibiting AND gate 396 but enabling AND gate 398 so that the shift register 404 operates as a recirculating memory. Accordingly, the signals received by the target processor 390 are fed by way of lines 394 and 400 to the exclusive OR gate 402, where the incoming signal is compared on a bit by bit basis with the recirculating word in register 404. The output of OR gate 402 will be all zeros unless there is a discrepancy between the new signal and the one previously stored, in which case a 1 output will be produced on line 418. Since output gate 420 is enabled at this time by flipflop 412, the 1 signal on line 418 will be fed through gate 420 and line 428 to a divide by 8 counter 430 to an error counter 432. The error counter counts the discrepancies detected by the exclusive OR gate 402 and when these exceed an adjustable full count, an alarm signal is transmitted by way of line 434 and an OR gate 436 to a one shot multivibrator 438 which operates a suitable alarm circuit. This alarm circuit may include a transistor switch Q4 which is cut off by an output from the multivibrator 438 for a predetermined amount of time, providing an open circuit between its collector and emitter terminals 440 and 442. This change in the condition of transistor Q4 may be sensed by a suitable alarm device.

The divide by eight counter 430 affords protection against occasional noise bursts. If 8 or more discrepancies are detected by the exclusive OR gate 402 in a single transmitter sweep, the divide by 8 counter will produce an output that will shift a flipflop 444, producing an output on line 446 which is fed through an OR gate 448 and line 450 to the reset input of flipflop 412 and to a reset input of the error counter 432. This resets the error counter and prevents an alarm signal, and at the same time inhibits gates 398 and 410 and enables gate 396 to cause a new sample of the area being protected to be entered into the shift register 404. If the same number of discrepancies occur on the next following sweep, however, flipflop 444 will be in the wrong condition to reset either flipflop 412 or the error counter and so the pulses this time are counted toward an alarm condition. Thus, the present system rejects a single noise burst while retaining sensitivity to a repeating condition.

The output of the divide by 32 network 362 is applied to a divide by 256 network 452, the output of which is applied by way of line 454 to a second input of the OR gate 448. Counter 452 thus provides an output signal, for example each 1.71 seconds, which serves to reset flipflop 412 periodically to obtain a new sample in the shift register 404. This arrangement causes the unit 390 to be recalibrated, or updated, periodically so that it will not be affected by slowly changing parameters such as oscillator frequency drifts, while allowing sufficient integration time to detect motion as slow as 0.1 foot per second, as previously discussed. In similar manner the unit 392 operates to process the data received during alternate portions of the received signal. It will be noted that the register 404 may be duplicated in unit 392, or alternatively a single 512 bit register may be used to handle the input for both units, the first half of the register being used for one unit and the other half for the other unit.

The threshold setting on the error counter acts as a sensitivity control for the system by allowing an optimum compromise to be found between target sensitivity and false alarm rate for each alarm system. In an unusually noisy environment, it may be desirable to compromise complete area coverage somewhat in order to eliminate false alarms. The digital control, together with the gain control in the receiver, provides maximum flexibility for special situations.

Tamper protection in the data line may be provided in all the embodiments disclosed herein by providing signal level sensing at the input to the data processors or by current sensing on the signal cable. The former arrangement offers the advantage of detecting any failure of the transmitter or receiver as well as the cable connecting these units with the data processor, but only when these sensors are in operation. The latter detects cable faults only, but detects them at all times. A combination of the two may be utilized, if desired.

In an actual embodiment of the invention, the intrusion detector of the present invention was found to have the following characteristics:

| | |
|---|---|
| Transmitter power output | 50 MW |
| Operating frequency | 2.45 GHz |
| Modulation | AM square wave, 6 Hz. FM sawtooth, 15 MHz deviation |
| Antenna gain | 8 db |
| Target sensitivity | −110 dbm |
| Signal processing | Analog range equalization, maximum and minimum range filtering, digital autocorrelation and noise burst rejection. |
| Range discrimination | Down 20 db at 25% over range setting |
| Size: Transceiver | 0.32 cubic feet |
| Size: Data processor | 0.17 cubic feet |
| Size: Power consumption | 1.5 watts total at 20 volts dc for two transceivers sharing one data processor |

Thus there has been provided an intrusion detector for detecting motion in large defined areas which is simple, accurate, easy to maintain and relatively inexpensive, while retaining great accuracy and reliability. The system utilizes frequency modulation in combination with amplitude modulation to facilitate multiple installation and provides a combination of analog and digital filtering to provide the necessary target discrimination in a reliable and economical manner. The system is monostatic which reduces manufacturing costs as well as simplifying installation. The self contained antenna system is virtually tamper proof and yet provides reasonably high gain. Although the invention has been described in terms of preferred embodiments, it will be apparent that numerous variations and modifications will be available to those of skill in the art without departing from the true spirit and scope of the invention as described in the following claims.

What is claimed is:

1. A motion sensor for detecting intruder motion within a protected area and for discriminating against motion outside the protected area, comprising:
   transceiver means including means for transmitting frequency modulated continuous wave signals in a pattern to cover said protected area, said transmitted signals having a selected, repetitive frequency sweep, and means for receiving signals reflected by target scatterers;
   means for demodulating said received signals to produce an ensemble of audio tones, each tone representing the range of a target scatterer;
   noise filter means for said tones, said filter means discriminating against tones produced by noise and clutter;
   range filter means for discriminating against tones received from target scatterers outside a predetermined zone;
   means for storing values representing said audio tones for a first frequency sweep of said transmitter;
   means for comparing said stored values with corresponding values derived from a second frequency sweep of said transmitter and for producing error signals corresponding to differences between the values corresponding to said first and second frequency sweeps, said differences representing motion of a target scatterer within said protected area; and
   alarm means responsive to a predetermined number of error signals.

2. The sensor of claim 1, further including notch filter means for said tones, said notch filter means being adjustable to discriminate against tones corresponding to signals reflected from selected target scatterers.

3. The sensor of claim 2, wherein said means for storing values comprises a capacitor.

4. The sensor of claim 1, further including means for sampling said filtered audio tones and means for converting each sample of said tones to a corresponding digital value.

5. The sensor of claim 4, wherein said means for storing values comprises a shift register.

6. The sensor of claim 5, wherein said means for comparing said stored values with corresponding values derived from a second frequency sweep includes recirculating means for said stored values.

7. The sensor of claim 6, wherein said means for storing values comrises first register means for receiving the digital value of each said sample, second register means for receiving the digital values of all the samples, and means for transferring the contents of said first register to said second register.

8. The sensor of claim 7, wherein said means for comparing comprises recirculating means for said second register, and means for sequentially comparing each sample digital value stored in said second register with a corresponding sample digital value representing said second frequency sweep as said stored value is recirculated for retention in said second register.

9. The sensor of claim 8, wherein said means for comparing comprises an exclusive OR gate which produces an output error signal for each discrepancy between said compared values.

10. The sensor of claim 9 further including counting means responsive to said output error signal for producing an alarm signal upon receipt of a predetermined number of error signals over a selected period of time.

11. The sensor of claim 10, further including alarm protection means for preventing an alarm signal of said predetermined number of error signals received in less than a second selected period of time, thereby preventing false alarm due to system noise.

12. The sensor of claim 11, further including means for comparing said sample digital values stored in said second register with sample digital values representing frequency sweeps of said transmitter subsequent to said second sweep, and means for selectively updating the sample values stored in said second register to prevent discrepancies due to motion of a target below a predetermined rate.

13. The sensor of claim 8, wherein said means for comparing includes means for weighting the comparison between said stored sample values and the digital value representing samples of said second frequency sweep, whereby only the selected most significant discrepancies produce error signals.

14. The sensor of claim 13, wherein said comparator includes a third register means for shifting the stored digital value of each sample of said first frequency sweep sequentially to said third register, and subtractor means for comparing the sample digital value in said third register with a corresponding sample digital value of said second sweep in said first register.

15. The sensor of claim 14, further including means for comparing the sample digital values stored in said second register with corresponding sample digital values of sweeps subsequent to said second sweep, and means for selectively updating the sample digital values in said second register.

16. The sensor of claim 8, wherein said means for comparing includes reversible counter means for preventing periodic motion below a selected amplitude from producing an error signal, said counter being sensitive to unidirectional target motion.

17. The sensor of claim 1, further including means for repeatedly sampling said filtered audio tones during each said frequency sweep and for converting each sample to a corresponding digital byte, a plurality of said bytes comprising a digital word representative of the audio tones produced during a single frequency sweep.

18. The sensor of claim 17, wherein said means for storing values comprises first register means for receiving each said digital byte from said sampling and converting means, second register means, and means for sequentially transferring each digital byte of said first frequency sweep to said second register means, whereby said second register stores the digital word representing said first frequency sweep.

19. The sensor of claim 18, further including averaging means for accumulating in said second register means a digital word corresponding to the average of the audio tone digital words of a first plurality of frequency sweeps, and wherein said means for comparing comprises means for comparing the digital word representing the audio tones of a subsequent second frequency sweep with said accumulated average digital word.

20. The sensor of claim 18, further including first averaging means for accumulating in said second register means a first digital word corresponding to the average of the audio tone digital words of a first plurality of frequency sweeps;

third register means;

second averaging means for accumulating in said third register means a second digital word corresponding to the average of the audio tone digital words of a second plurality of frequency sweeps; and means for comparing said first and second averaged digital words and for producing said error signals.

21. The sensor of claim 17, wherein said transceiver means includes first and second transmitters for alternately transmitting said modulated signals, and wherein said means for storing comprises first and second target processors corresponding to said first and second transmitters and alternately enabled to receive digital word values representing the amplitude of the audio tones returned from corresponding transmitters.

22. The sensor of claim 21, wherein each said target processor includes first register means for receiving and storing a digital word representing the amplitude of the audio tones representing a corresponding first frequency sweep, and comparator means for comparing said digital word with subsequent digital words representing corresponding second frequency sweeps.

* * * * *

UNITED STATES PATENT AND TRADEMARK OFFICE
CERTIFICATE OF CORRECTION

PATENT NO. : 3,967,283

DATED : June 29, 1976

INVENTOR(S) : Robert V. Clark, Francis X. Linder, Terrence J. McCreary, William R. Taylor It is certified that error appears in the above—identified patent and that said Letters Patent are hereby corrected as shown below:

Claim 11, line 2, "of" should be --if--;

Claim 11, line 3, "signals" should be --signals is--.

Signed and Sealed this

Twenty-second Day of November 1977

[SEAL]

Attest:

RUTH C. MASON
Attesting Officer

LUTRELLE F. PARKER
Acting Commissioner of Patents and Trademarks